3,220,956
PROCESS FOR REMOVING METAL POISONS FROM
HYDROCARBON CONVERSION CATALYSTS
Robert H. Cramer, Woodbury, and Abbott F. Houser, Merchantville, N.J., assignors to Socony Mobil Oil Company, Inc., a corporation of New York
No Drawing. Filed Dec. 28, 1961, Ser. No. 162,972
2 Claims. (Cl. 252—413)

This invention relates to a process for removing metal contaminants from a catalytic composite useful for conversion of higher boiling hydrocarbons to lower boiling hydrocarbons such as gasoline. More particularly, the present invention is directed to a method for removing metal contaminants, especially nickel contaminants, from siliceous cracking catalysts which have become poisoned during hydrocarbon conversion operations.

Siliceous cracking catalysts, including naturally occurring activated clays and synthetically prepared composites, have long been recognized as useful in catalytically promoting hydrocarbon conversion reactions. Such siliceous catalysts contain silica and one or more metal oxides. In clays, the metal oxide present is predominantly alumina. Active synthetic cracking catalysts are generally gels or gelatinous precipitates and include silica-alumina, silica-zirconia, silica-beryllia, and silica-magnesia, as well as ternary combinations such as silica-alumina-zirconia, silica-alumina-beryllia, and silica-alumina-magnesia. Ordinarily, this type of catalyst contains silica and at least one material selected from the group of alumina, zirconia, beryllia, and magnesia. Other metal oxides may also be present, if desired, generally in small percentage, such as those of manganese, chromium, titanium, tungsten, molybdenum and calcium. Synthetic siliceous cracking catalysts may be prepared by various well-known methods, such as by co-gelation or co-precipitation of the silica and metal oxide, or by milling together the separately precipitated or gelled components. Alternatively, the metal oxide may be combined with a previously formed siliceous gel utilizing impregnation or base exchange techniques. The present invention, however, is not limited to catalysts prepared by a particular method but is of general application to siliceous cracking catalysts. It will thus be understood that catalysts undergoing treatment in accordance with the present invention may be any of the siliceous cracking catalysts heretofore customarily employed, which are susceptible to poisoning by the presence of various metal contaminants, such as vanadium, iron and especially nickel metal poisons. It will further be understood that the treatment described herein may be performed on metal-poisoned catalysts before the same have been used in hydrocarbon conversion or on metal-poisoned catalysts which have been previously utilized in promoting the conversion of hydrocarbons.

Commercial catalytic cracking is carried out by contacting a hydrocarbon charge in the vapor or liquid state with a catalyst of the foregoing type under conditions of temperature, pressure, and time to achieve substantial conversion of the charge to lower boiling hydrocarbons. This cracking reaction results in deposition of a carbonaceous deposit commonly called "coke" with consequent decline in catalytic activity of the catalyst. Under conditions to obtain efficient operation from a yield standpoint, it is found desirable to terminate the cracking reaction after a relatively short conversion run, for example, of from 5 to 15 minutes on stream, and thereafter to restore the activity of the catalyst by burning off the coke in a regeneration stage. The formation of coke represents a net loss, since hydrocarbons are consumed in its production. In addition, it is apparent that the greater the coke deposit, the longer the regeneration period would have to be in proportion to the on-stream period in order not to exceed detrimental temperature levels during regeneration.

Of the metal contaminants on poisoned catalysts, minute amounts of nickel are highly detrimental to the efficiency of the siliceous cracking catalysts above-described. Such catalysts, contaminated even with an extremely small amount of nickel, exhibit decreased activity and excessive coke formation during cracking reactions. In fact, commercial experience with such a poisoned catalyst shows about 50 percent more coke made by the catalyst at equilibrium activity than is produced by the catalyst in unpoisoned condition. Furthermore, since the major portion of the catalyst remains in the cracking system over an extended period of time with recirculation, the amount of nickel contaminant, as well as other metal contaminants, gradually builds up to such a point that further contact of the cracking charge with the catalyst becomes an uneconomical operation. The contaminants may be introduced during preparation of the catalyst, or it may be introduced with the charge stock, or it may be eroded from the equipment. Regardless of its manner of introduction, the presence of nickel contaminant in the siliceous cracking catalyst employed is definitely detrimental, leading to the production of an excessive amount of coke.

The poisoning effects of minute amounts of nickel on siliceous cracking catalysts have heretofore been recognized in the art. Various techniques have been suggested to remove the nickel contaminant. In general, such techniques have involved rather drastic measures, including removal of the poisons by abrading off the surface of the catalyst. In other cases, excessive heat treatment has been suggested for removing the nickel contaminant despite the danger of surface area destruction in the catalyst due to sintering.

It is a major object of this invention to overcome the difficulties caused by the poisoning effects of metal contaminants on the conversion efficiency of hydrocarbon conversion catalysts. A more specific object is the provision of a chemical method for removing nickel contaminants from a nickel-poisoned hydrocarbon conversion catalyst to improve its efficiency and activity in the hydrocarbon cracking reaction.

The above and other objects which will be apparent to those skilled in the art are achieved by the process described herein. The present invention involves a unique chemical process for the removal of nickel contaminants from poisoned hydrocarbon conversion catalysts by the initial hydrogen reduction of the nickel poisons, followed by extraction of the reduced nickel utilizing an aqueous solution of a mixture of a water soluble acid and a water soluble ammonium salt and subsequently water washing the extracted catalyst free of soluble matter. The treated catalyst, after drying by conventional means, is significantly improved in its activity and conversion properties over its original nickel contaminated form.

In the practice of the invention, a siliceous cracking catalyst contaminated with metal poisons including nickel during a hydrocarbon conversion process is initially contacted with hydrogen to reduce the nickel poison. Hydrogen is passed over the catalyst utilizing atmospheric or higher pressures. It is preferable to use as low pressures as possible such as atmospheric to 30 pounds per square inch so as to avoid utilizing expensive high pressure equipment. However, if the use of expensive high pressure equipment is not a problem, it may be desirable to use high pressures which may range up to 5000 pounds per square inch. The temperature of the catalyst in the hydrogen reduction can range from about 500° F. to about 1650° F. preferably in the range from about 800° F. to about 1500° F. At temperatures greater than 1650°

F., the danger of surface area destruction of the catalyst is present and these excessive temperatures should be avoided. The combination of pressures and temperatures can be utilized so as to obtain the fastest and most complete reduction possible without damaging the catalyst. Under these conditions, if low temperatures are used, it is advisable to use higher pressures while at higher temperatures lower pressures can be utilized. The time of reduction can range from about 1 hour to about 72 hours, preferably in the range of 1 hour to about 16 hours. To obtain the amount of reduction desirable, it is preferred to reduce the poisoned catalyst in excess of about one hour.

After the hydrogen treatment of the nickel-poisoned catalyst has been completed, a solution of a mixture of a water soluble acid and water soluble ammonium salt is passed over the catalyst for a period of time to remove and extract substantially all of the reduced nickel and other metal poisons such as vanadium, iron and the like. The water soluble acids which can be used in the extraction solution include organic or inorganic acids. Suitable organic acids which can be used include acetic acid, propionic acid, ethylenediaminetetraacetic acid and other water soluble organic acids. Any water soluble inorganic acids can be used but preferred acids are the water soluble mineral acids such as nitric acid, sulfuric acid, hydrochloric acid, and the like. The water soluble ammonium salts which can be used in the extraction solution include ammonium chloride, ammonium chlorate, ammonium sulfate, ethylene diamine, ethylenediaminetetraacetic acid, 2,2′-bipyridine, 2,3-butanediamine, trans-1,2-cyclopentandiamine, diethylenetriamine, dimethylglyoximate, 1,2-propanediamine, pyridine, thiouria, triethylenetetramine and the like. The amount of water soluble acids which can be used in the extraction solution can range from about 0.1 to about 5.0 weight percent or higher, preferably in the range from about 0.5 to about 2.0 weight percent. The amount of water soluble ammonium salts which can be used in the extraction solution can range from about 0.1 to about 2.0 weight percent or higher preferably in the range from about 0.1 to about 1.0 weight percent. The temperature of the extraction solution in the process of this invention can range from about 100° F., or lower, to about 212° F., preferably in the range from about 150° F. to about 212° F. The relative amounts of extraction solution and poisoned catalyst are not necessarily critical and a broad range can be defined as weight ratio of extraction solution to catalyst ranging from about 1 to about 50, preferably in the range from about 2 to about 10. The extraction process is carried out for a period of time sufficient to remove a substantial proportion of the reduced nickel. The time can range from about 30 minutes or less to about 24 hours or greater, preferably from about 2 hours to about 18 hours.

After the extraction step has been completed, the catalyst is then water washed to remove substantially all of the water soluble salts. The water soluble salts, not removed from the catalyst, can include metal poisons which may seriously affect the catalyst's activity and selectivity. The temperature of the water used for washing can range from about room temperature, or lower, to about 200° F., preferably from about 70° F. to about 120° F. The water can be passed over the catalyst at any reasonable flow rate and can be conducted for a sufficient period of time to remove substantially all of the water soluble salts and the time for water washing can range from about 30 minutes or less to about 10 hours or higher.

After the water wash step, the catalyst can be dried using conventional drying procedures. The drying can be conducted in an inert gas, air, steam or combinations thereof. As long as critically high temperatures, which cause rapid shrinkage or sintering of the catalyst, are avoided, any feasible drying temperature can be utilized.

After the hydrogen reduction, extraction, water washing and drying procedure, the catalyst is in a reactivated state and may be introduced or returned to the conversion chamber of the cracking unit for further use in catalytically promoting the conversion of higher boiling hydrocarbons to hydrocarbons boiling in the range of gasoline.

An additional modification of the above-described process for the removal of nickel and other metal contaminants may be utilized herein. In using the hydrogen reduction step wherein the nickel contaminants are reduced for further extraction, the vanadium contaminants tend to reduce also and become extremely difficult to extract using the extraction solutions described herein. If hydrogen reduction temperatures above about 1400° F. are to be used, it would then be highly desirable to extract the vanadium poisons, among other soluble poisons, prior to the hydrogen reduction step using the same type of aqueous solution of a water soluble acid and water soluble ammonium salt, hereinbefore described for use after the hydrogen-reduction step. The extracted catalyst is then water washed to remove the water soluble material; the catalyst can be dried and the nickel removal process, hereinbefore described, i.e., hydrogen reduction followed by extraction, is then carried out. The combination of these steps will not only remove the nickel and iron contaminants, among others, but also the vanadium contaminants as well.

The following examples will serve to illustrate the process of the invention without limiting the same:

Example 1

Portions of a nickel-poisoned siliceous cracking catalyst containing approximately 10 weight percent $SiO_2$, 89.8 weight percent $Al_2O_3$ and 0.2 weight percent $Cr_2O_3$ were subjected to hydrogenation, extraction and water washing, the process of this invention and to other variations not included in the process of the invention to demonstrate the effectiveness of the present invention. The process and results are demonstrated in Table I below:

TABLE I.—POISON CATALYST

| | | | | | |
|---|---|---|---|---|---|
| Hydrogen reduction—0 p.s.i.g.: | | | | | |
| Time, hours | | | | 5 | 5 | 5 |
| Temperature, °F | | | | 1,100 | 1,300 | 1,400 |
| Extraction: | | | | | | |
| Temperature, °F | | 200 | 200 | 200 | 200 |
| Time, hours | | 24 | 24 | 8 | 8 | 8 |
| Solution, gram per gram catalyst | | 24 | 24 | 20 | 20 | 20 |
| Nitric acid, weight percent | | | 1 | 1 | 1 | 1 |
| Ammonium nitrate, weight percent | | 0.5 | | 0.5 | 0.5 | 0.5 |
| Ethylenediaminetetraacetic acid, weight percent | | 2.0 | | | | |
| Water, weight percent | | 97.5 | 99 | 98.5 | 98.5 | 98.5 |
| Water wash continuously 1 hr.: | | | | | | |
| Temperature, °F | | ≈80 | ≈80 | ≈80 | ≈80 | ≈80 |
| Product: | | | | | | |
| Nickel, parts per million | 190 | 145 | 140 | 88 | 27 | 10 |
| Nickel removal, weight percent | | 24 | 26 | 54 | 86 | 95 |
| Vanadium, parts per million | 260 | 94 | 130 | 105 | 130 | 230 |
| Vanadium removal, weight percent | | 60 | 50 | 60 | 50 | 5 |

Table I demonstrates that the amount of poisoned nickel removed using the process of this invention is at least twice the amount or higher of the nickel removed by the compared extraction processes.

Example 2

A nickel-poisoned 200 gram commercial siliceous cracking catalyst sample (described in Example 1) which contained 190 parts per million (p.p.m.) of nickel and 320 p.p.m. of iron was used to crack a standard charge stock under standard cracking operations described below:

Charge stock _____ Mid-Continent gas oil boiling range 525–1000° F.
Liquid hourly space velocity ____ 1.5.
Average bed temperature, ° F. __ 875.
Rates of volume of catalyst to volume of oil charge _____ 4.0.

The yield data obtained is described in Table II.

The nickel-poisoned catalyst was then subjected to a reduction operation using hydrogen at 0 p.s.i.g. for 5 hours while maintaining the catalyst temperature at 1400° F. The hydrogen reduced catalyst was cooled to room temperature and purged free of hydrogen with oxygen-free nitrogen. The hydrogen reduced catalyst was then treated with 800 grams of a solution composed of 1 weight percent $HNO_3$, 0.5 weight percent $NH_4NO_3$ and 98.5 weight percent water solution for 8 hours at 200° F. The treated catalyst was then continuously water washed for one hour with 100 milliliters of water per minute, i.e., a ratio of 0.44 milliliter of water per milliliter of catalyst at room temperature. The catalyst was steamed 24 hours at 1100° F. at 0 p.s.i.g. in a 100 percent steam atmosphere. This treated catalyst was used to crack the same standard charge used for the nickel poisoned catalyst under the same cracking operations. The results are demonstrated in Table II.

TABLE II

| Catalysts | Poisoned | Treated |
|---|---|---|
| Metal contaminants (parts per million): | | |
| Nickel | 190 | 57 |
| Iron | 320 | (¹) |
| Yields: | | |
| Conversion, volume percent | 39.8 | 42.2 |
| Gasoline, $C_5+$, volume percent | 30.0 | 31.6 |
| $C_4$, total, volume percent | 9.6 | 10.4 |
| Dry gas, weight percent | 4.5 | 4.8 |
| Coke, weight percent | 3.1 | 2.8 |
| Hydrogen, weight percent | 0.26 | 0.14 |

¹ Not detectable.

These data show that after 70 percent of the nickel poisons were removed, the cracked product distribution has been improved with increased conversions, increased gasoline yields and increased $C_4$ yield while the amount of coke was reduced and approximately 50 percent reduction in hydrogen made. Increasing the amount of nickel removal will provide further improvements.

It is to be understood that the above description is merely illustrative of various embodiments of the invention. It should be understood that this invention includes all changes and modifications of the examples of the invention herein chosen for purposes of disclosure which do not constitute departures from the spirit and scope of the invention.

What is claimed is:

1. A method for reactivating a siliceous cracking catalyst poisoned by contaminating amounts of nickel and vanadium which comprises subjecting the catalyst to a reducing atmosphere at an elevated temperature in the range of from about 500° F. to about 1650° F. for a desired length of time intermediate at least two stages of washing the siliceous cracking catalyst with an aqueous solution comprising less than about 5 weight percent of an acid combined with less than 2.0 weight percent of an ammonium salt dissolved therein.

2. A method for reactivating a siliceous cracking catalyst containing undesired vanadium and nickel contaminates which comprises washing the catalyst with a dilute aqueous solution of an acid in admixture with an ammonium salt at a temperature in the range of from about 100° F. to about 212° F. to remove soluble metal contaminates, drying and reducing the thus washed catalyst at a temperature in the range of from about 800° F. to about 1500° F. and thereafter washing the catalyst again with the dilute aqueous solution of acid combined with an ammonium salt to remove metal contaminates not removed in the initial washing step.

References Cited by the Examiner

UNITED STATES PATENTS

| 2,369,956 | 2/1945 | Feisst et al. | 252—413 |
| 2,380,731 | 7/1945 | Drake et al. | 252—413 |
| 2,668,798 | 2/1954 | Plank | 252—413 |

OTHER REFERENCES

Partington, "A Textbook of Inorganic Chemistry," Macmillan & Co., Ltd., London, 1926, pp. 1004–1005.

MAURICE A. BRINDISI, *Primary Examiner.*